United States Patent [19]
Gilch et al.

[11] Patent Number: 5,266,606
[45] Date of Patent: Nov. 30, 1993

[54] MOISTURE-CURING, HOT-MELT POLYURETHANE ADHESIVE COMPOSITIONS

[75] Inventors: Heinz G. Gilch, Bad Homburg; Walter Rath; Karsten Seitz, both of Oberursel, all of Fed. Rep. of Germany

[73] Assignee: Bostik, Inc., Middleton, Mass.

[21] Appl. No.: 39,518

[22] Filed: Mar. 29, 1993

Related U.S. Application Data

[63] Continuation of Ser. No. 518,577, May 3, 1990, abandoned.

[30] Foreign Application Priority Data

May 19, 1989 [GB] United Kingdom ............... 8911592

[51] Int. Cl.$^5$ .................. C08J 9/12; C08G 18/10
[52] U.S. Cl. .................... 521/159; 521/160; 521/908
[58] Field of Search ............ 521/78, 159, 160, 908

[56] References Cited

U.S. PATENT DOCUMENTS

| | | | |
|---|---|---|---|
| 3,830,760 | 8/1974 | Bengtson | 521/159 |
| 3,927,162 | 12/1975 | Stalter, Sr. | 521/78 |
| 4,263,412 | 4/1981 | Pauls | 521/159 |
| 4,423,161 | 12/1983 | Cobbs, Jr. et al. | 521/78 |
| 4,489,176 | 12/1984 | Kluth et al. | 521/144 |
| 4,618,651 | 10/1986 | Gilch et al. | 525/130 |
| 4,999,407 | 3/1991 | Gilch et al. | 525/457 |
| 5,021,507 | 6/1991 | Stanley et al. | 521/159 |
| 5,173,538 | 12/1992 | Gilch et al. | 525/455 |

FOREIGN PATENT DOCUMENTS 2733847 2/1978 Fed. Rep. of Germany .
1326618 8/1973 United Kingdom .

*Primary Examiner*—Maurice J. Welsh
*Assistant Examiner*—Rabon Sergent
*Attorney, Agent, or Firm*—David G. Conlin; Peter F. Corless

[57] ABSTRACT

A moisture-curing hot-melt polyurethane adhesive foam comprising isocyanate-terminated polyurethane prepolymers based on polyester or polyether and having a melting point of 40° to 60° C. or a glass transition point above room temperature, melted together, optionally with a nucleating agent and/or a surfactant, treated with an inert gas under pressure and released in ambient pressure is allowed to cure as a foam whereby a cure rate is achieved of at least ten times that of the composition when not foamed; extremely rapid cure rates are achieved and thick bond lines are readily obtained.

23 Claims, No Drawings

MOISTURE-CURING, HOT-MELT POLYURETHANE ADHESIVE COMPOSITIONS

This is a continuation of copending application(s) Ser. No. 07/518,577 filed on May 19, 1990, now abandoned.

BACKGROUND OF THE INVENTION

The present invention relates to moisture-curing, hot-melt polyurethane adhesive compositions with enhanced curing rates.

The uses of moisture-curing, hot-melt polyurethane adhesives is constrained by the time taken to achieve adequate mechanical strength. Many users find the cure rate of moisture-curing hot-melt polyurethane to be too slow, especially when applied in thicker layers. We have found that foaming of these adhesives leads to materials which show a dramatic increase in cure rate.

SUMMARY OF THE INVENTION

According to the present invention a moisture-curing, hot-melt, polyurethane adhesive composition comprising isocyanate-terminated polyurethane prepolymers based on polyester or polyether and having a melting point of 40°-60° C. or a phase transition point above room temperature wherein the composition is produced as a foam by introducing an inert gas under pressure to the molten composition and releasing the resulting composition to ambient pressure, the resultant foam being allowed to cure whereby a cure rate is achieved of at least ten times, and preferably at least one hundred times, the cure rate of the composition when not foamed. At least one surfactant and/or at least one nucleating agent may be included in the composition in order to optimise foam quality.

German patent specification DE 27 33 847 discloses foaming of melt adhesives by mixing with a gas, optionally when the adhesive is molten, so that the gas is dissolved and then releasing the pressure so that the gas comes out of solution to form an adhesive foam. It is claimed that this foaming of the adhesive enhances spreading and wet-out so that bond strength is improved and/or that the amount of adhesive required to provide a bond is reduced. However, there is no teaching whatsoever concerning curing rate and no one would have been led to predict a dramatic change in the rate of curing of such hot-melt adhesives, particularly polyurethane compositions.

The isocyanate-terminated polyurethane prepolymers used in the present invention are based on polyester or polyether and have a melting point of 40°-60° C. or a glass transition point above room temperature. Prepolymers based on polyether have a glass transition point above room temperature.

Surfactant may be included in an amount of 0.01 wt % to 5 wt %, preferably 0.05 wt % to 1 wt %. Polysiloxane-polyether-block-copolymers are preferred surfactants for use in the present invention.

Nucleating agents such as oxides such as titanium dioxide, fumed silica or carbon black may be used in the present invention. Fumed silica is a preferred nucleating agent, used in amounts of 0.01 wt % to 5 wt %, preferably 0.05 wt % to 0.5 wt %.

Nitrogen, rare gases, carbon dioxide or halogenated hydrocarbons are suitable for use as inert gases in the present invention.

The foamed polyurethane hot-melts cure very much faster than unfoamed materials. Cure rate of foamed materials according to the invention may exceed 1 mm/hour whereas the cure rate of unfoamed material is lower than 1 mm/week.

The use of nucleating agents and surfactants produce more uniform adhesive foams with accelerated cure rate.

The foams produced according to the present invention have a closed surface and a density in the range 0.1–1.0 g/cm$^3$, preferably 0.3–0.8 g/cm$^3$. The bubble diameters are in the range 50–2000$\mu$, preferably 100–500$\mu$.

The mechanical properties of the foamed materials change considerably during the curing process. Uncured foams have only a very limited resistance to mechanical stresses. Foam collapse or material break occurs when uncured foams are exposed to compressive forces or when a supporting substrate such as a beam is deflected, whereas cured foams can be exposed to much higher forces without destruction. Furthermore, they often recover after the stresses are removed as is shown hereunder.

To produce foam in accordance with the present invention, moisture-curing hot-melt polyurethane adhesive is melted, optionally together with surfactant and/or nucleating agent, in a reaction vessel and inert gas is dissolved in the resultant melt while it is stirred. A suitable reaction vessel is described in DE 27 33 847 and can be obtained from Nordson Corp. When the melt is then discharged and the pressure removed, a molten foam results. The hot molten foam can then be applied to substrates as adhesive. After joining substrates, cooling of the foam below its melting point or glass transition point provides initial bond strength after a very short time. Subsequent cure by diffusion of moisture into the materials leads to the development of the final strength of the bond.

Such foamed polyurethane adhesives offer advantages over unfoamed adhesives, especially when porous or uneven substrates are bonded, because the presence of the gas bubbles in the foam prevents the polymer from sagging into small pores while at the same time forces it into big gaps.

Another advantage is the possibility of establishing very thick bond lines which may be required in certain applications. This is due to the fact that foamed melt adhesives have a strongly decreased tendency to flow off.

The present invention may be used with a quicksetting polyurethane adhesive composition comprising a mixture of at least two amorphous polyurethane prepolymers, each prepolymer providing a different glass transition temperature, preferably one prepolymer with a glass transition temperature above room temperature and a second prepolymer with a glass transition temperature below room temperature. Such compositions are described and claimed in our U.S. Pat. No. 4,999,407, filed 4 May 1989.

The present invention may also be used with a quicksetting, hot-melt polyurethane composition comprising a mixture of at least two polyurethane prepolymers including a first polyether-base polyurethane prepolymer having a glass transition temperature above room temperature and a second polymer or polyurethane prepolymer with a glass transition temperature below room temperature. Such compositions are described and claimed in our copending U.S. patent application Ser. No. 422932 filed 17 Oct. 1989.

DETAILED DESCRIPTION OF THE INVENTION

In order that the present invention be better understood, preferred Examples will hereinafter be described in greater detail.

EXAMPLE 1

A mixture of 78 g methylene diphenyl diisocyanate, 1.47 g tosylisocyanate and 571 g hexanediol adipate (mwt. approx. 3000) was reacted in a pressure vessel equipped with an efficient stirrer and heating means and having a gas inlet and outlet. The mixture was stirred for one hour at 80° C., then 0.57 g of dibutyltin laurate were added as catalyst, followed by 0.65 g polysiloxane-polyether-blockcopolymer as surfactant and 0.66 g fumed silica as nucleating agent.

At a temperature of 100° C., the reaction vessel was pressurised with 8–10 atm of dry nitrogen and the rate of stirring increased to 500–700 rpm. Vigorous stirring was maintained for 30 min, then the bottom outlet of the vessel was opened and the molten material released. This resulted in a molten foam, having a density of 0.67 g/cm$^3$ (RT) and which was stable for several hours at 100° C.

Bubble diameters were in the range of 50–1000μ, with a considerable number of open cells. The foam had a smooth surface. Blocks of this foam showed a cure rate of 1 mm/h at room temperature and approx. 50% relative humidity. Material produced in the same fashion but without foaming cured with a speed of less than 1 mm/week.

Mechanical properties of the foamed material in the uncured and in the cured state may be compared:

| (Measurements carried out at room temperature) | | |
|---|---|---|
| Stress-strain behaviour (compression) in accordance with DIN 53423: | | |
|   | Stress (N/mm$^2$) | Strain (%) |
| Uncured Material | 3.2 | 8–10 |
|   | >3.2 | collapse |
| Cured Material | 9.3 | 50 |
|   | 2.8 | 10 |
| Maxium deflection of a beam in accordance with DIN 53421: | | |
|   | Load (N) | Deflection (mm) |
| Uncured | 230 | 6*) |
| Cured | 312 | 22**) |

*)Material break
**)Material recovered after unloading

The inclusion of surfactant and nucleating agent produces a foam of excellent quality but for some uses foam of acceptable quality can be produced when the surfactant and/or the nucleating agent are omitted.

EXAMPLE 2

The preparation described in Example 1 was repeated except that the polysiloxane-polyether-block copolymer (surfactant) was not included. The resulting foam had a density of 0.65 g/cm$^3$ and showed a cure rate of 0.5–1.0 mm/h at room temperature and 50% Relative Humidity.

EXAMPLE 3

The same preparation described in Examples 1 and 2 was repeated, this time omitting both the polysiloxane-polyether block copolymer (surfactant) and the fumed silica (nucleating agent). The resulting foam had a density of 0.70 g/cm$^3$ and a cure rate of 0.5–1.0 mm/h at room temperature and 50% Relative Humidity.

EXAMPLE 4

The preparation described in Example 1 was repeated except that in this case 0.65 g polysiloxane-polyether block copolymer was included but the fumed silica (nucleating agent) was omitted. The resulting foam had a density of 0.62 g/cm$^3$ and a cure rate of 0.5–1.0 mm/h at room temperature and 50% Relative Humidity.

The foams produced in Examples 2, 3 and 4 showed the same kind of properties as the foam produced in Example 1 and had the same kind of advantages when compared with materials of the same composition produced without foaming.

We claim:

1. A moisture-curing, hot-melt, polyurethane adhesive composition comprising an isocyanate-terminated polyurethane prepolymer based on a polyester or a polyether and having a melting point of 40°–60° C. or a phase transition point above room temperature, the polyurethane adhesive composition produced by a process comprising introducing an inert gas under pressure to the polyurethane composition in a molten state, and releasing the resulting polyurethane composition to ambient pressure to provide a foamed polyurethane composition, whereby the foamed composition has a cure rate at least about ten times the cure rate of the adhesive composition when not foamed.

2. The hot-melt polyurethane composition of claim 1 where the foamed composition is cured at a rate of at least about one hundred times the cure rate of the polyurethane composition when not foamed.

3. The hot-melt polyurethane composition of claim 1 where a 1 millimeter thick layer of the foamed composition is cured at a rate of about one hour or less.

4. The hot-melt polyurethane composition of claim 1 comprising a surfactant in an amount of from about 0.01 to 5 weight percent.

5. The hot-melt polyurethane composition of claim 1 comprising a surfactant in an amount of from about 0.05 to 1 weight percent.

6. The hot-melt polyurethane composition of claim 1 comprising a polysiloxane-polyether-block-copolymer.

7. The hot-melt polyurethane composition of claim 1 where the composition comprises at least one nucleating agent.

8. The hot-melt polyurethane composition of claim 7 where the nucleating agent is selected from the group consisting of an oxide, a fumed silica and carbon black.

9. The hot-melt polyurethane composition of claim 7 where the nucleating agent is present in the composition in an amount in the range of from about 0.01 to 5 weight percent.

10. The hot-melt polyurethane composition of claim 7 where the nucleating agent is present in the composition in an amount in the range of from about 0.05 to 0.5 weight percent.

11. The hot-melt polyurethane composition of claim 1 where the foamed composition has a density of from about 0.1 to 1.0 g/cm$^3$.

12. The hot-melt polyurethane composition of claim 1 where the foamed composition has a density of from about 0.3 to 0.8 g/cm$^3$.

13. The hot-melt polyurethane composition of claim 1 where the foamed composition comprises bubbles having a diameter in the range of from about 50 to 2000μ.

14. The hot-melt polyurethane composition of claim 1 where the foamed composition comprises bubbles having a diameter in the range of from about 100 to 500μ.

15. The hot-melt polyurethane composition of claim 1 where the polyurethane composition comprises a mixture of at least two amorphous polyurethane prepolymers, wherein at least one of the polyurethane prepolymers has a glass transition point above room temperature and at least one of the polyurethane prepolymers has a glass transition point below room temperature.

16. The hot-melt polyurethane composition of claim 1 where the polyurethane composition comprises a mixture of at least two polyurethane prepolymers, wherein at least one of the prepolymers is a polyether-based polyurethane having a glass transition point above room temperature and at least one of the polyurethane prepolymers has a glass transition point below room temperature.

17. The hot-melt polyurethane composition of claim 1 where the foamed composition is a solid prior to curing.

18. A method for enhancing the cure rate of a moisture-curing, hot-melt, polyurethane adhesive composition that comprises an isocyanate-terminated polyurethane prepolymer based on a polyester or a polyether and having a melting point 40°-60° C. or a phase transition point above room temperature, the method comprising:

(a) introducing an inert gas under pressure to the polyurethane composition in a molten state;

(b) releasing the resulting polyurethane composition to ambient pressure to provide a foamed polyurethane composition; and (c) curing the foamed composition at a rate of at least about ten times the cure rate of the polyurethane composition when not foamed.

19. The method of claim 18 where the foamed composition is cured at a rate of at least about one hundred times the cure rate of the adhesive composition when not foamed.

20. The method of claim 18 where the polyurethane composition comprises a mixture of at least two amorphous polyurethane prepolymers, wherein at least one of the polyurethane prepolymers has a glass transition point above room temperature and at least one of the polyurethane prepolymers has a glass transition point below room temperature.

21. The method of claim 18 where the polyurethane composition comprises a mixture of at least two polyurethane prepolymers, wherein at least one of the prepolymers is a polyether-based polyurethane having a glass transition point above room temperature and at least one of the polyurethane prepolymers has a glass transition point below room temperature.

22. The method of claim 18 where the foamed composition is a solid prior to curing.

23. The method of claim 18 where the foamed composition is cooled below its melting point or glass transition point and is subsequently cured by diffusion of moisture through the solid foamed composition.

* * * * *